United States Patent
Kuzuyama et al.

(10) Patent No.: US 7,971,564 B2
(45) Date of Patent: Jul. 5, 2011

(54) PREMIXED COMPRESSION IGNITION TYPE ENGINE AND METHOD OF CONTROLLING INTAKE AIR THEREOF

(75) Inventors: Hiroshi Kuzuyama, Aichi (JP); Masahiro Machida, Aichi (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 278 days.

(21) Appl. No.: 12/223,760

(22) PCT Filed: Apr. 4, 2007

(86) PCT No.: PCT/JP2007/057560
§ 371 (c)(1),
(2), (4) Date: Aug. 7, 2008

(87) PCT Pub. No.: WO2007/125735
PCT Pub. Date: Nov. 8, 2007

(65) Prior Publication Data
US 2009/0031985 A1    Feb. 5, 2009

(30) Foreign Application Priority Data

Apr. 27, 2006 (JP) .................................. 2006-123735

(51) Int. Cl.
*F02M 35/10* (2006.01)
(52) U.S. Cl. ................................................. 123/184.21
(58) Field of Classification Search .................. 123/308, 123/432, 559.1, 188.14, 184.45, 184.53, 123/316, 198 F, 568.17; 60/600, 605, 611, 605.1, 609; 261/44.6, 44.3, 23.2, 145; 137/595; F02M 35/10
See application file for complete search history.

(56) References Cited

U.S. PATENT DOCUMENTS

| | | | | |
|---|---|---|---|---|
| 4,488,531 | A * | 12/1984 | Tadokoro et al. | 123/559.1 |
| 5,553,580 | A * | 9/1996 | Ganoung | 123/308 |
| 6,739,295 | B1 | 5/2004 | Yamaoka et al. | 123/90.15 |
| 7,128,062 | B2 * | 10/2006 | Kuo et al. | 123/568.14 |

OTHER PUBLICATIONS

International Search Report for PCT/JP2007/057560, mailed Jul. 3, 2007.

* cited by examiner

*Primary Examiner* — Michael Cuff
*Assistant Examiner* — Keith Coleman
(74) *Attorney, Agent, or Firm* — Locke Lord Bissell & Liddell LLP

(57) ABSTRACT

An intake passage (10) communicating with a combustion chamber (3) comprises a first branch intake passage (16) having an intake port (4) at one end thereof and also having an intake manifold including a surge tank (13), a second branch intake passage (17) having an intake port (14) at one end thereof and also having an intake manifold including a surge tank (23), and a common intake passage (19) communicating with the ends of the first branch intake passage (16) and the second branch intake passage (17). The common intake passage (19) is provided with a mixer (11) for producing a mixture. The intake passage (10) is provided with a switching valve (18) for bringing the common intake passage (19) into communication with at least one of the first branch intake passage (16) and the second branch intake passage (17).

5 Claims, 6 Drawing Sheets

PREMIXED COMPRESSION IGNITION TYPE ENGINE AND METHOD OF CONTROLLING INTAKE AIR THEREOF

TECHNICAL FIELD

The present invention relates to a premixed compression ignition type engine and a method of controlling intake air thereof.

BACKGROUND ART

In recent years, premixed compression self-ignition (homogeneous charge compression ignition (HCCI)) type engines which operate with high efficiency and discharge low amounts of NOx have been drawing attention. Because premixed compression self-ignition (HCCI) combustion enables operation under a leaner mixture than spark ignition (SI) combustion, it has the advantages of increased thermal efficiency and decreased the maximum combustion temperature. However, the control of ignition timing is difficult, and despite of ignition timing control utilizing internal EGR and so on, the operational range ensuring stable combustion is still limited. Therefore, an engine switching between HCCI combustion and SI combustion in accordance with its operational range has been proposed. An example of such an engine is disclosed in Patent Document 1. Various conditions of HCCI combustion and SI combustion differ, such as the amount of EGR gas and that of the mixture required in the combustion chamber. For example, when switching from SI combustion to HCCI combustion, the amount of gas in the combustion chamber which is composed of the mixture and EGR gas (referred to hereinafter as in-cylinder gas) needs to be increased. On the other hand, the operational range allowing HCCI combustion to be performed stably ranges from an intermediate-rotation intermediate-load side to a low-rotation low-load side. Accordingly, at the time of switching combustion, the throttle valve in the intake passage tends to close, and the pressure is negative in a space from a region downstream of the throttle valve to an intake port located short of each combustion chamber. Therefore, even if the throttle valve is controlled so as to fully open upon switching combustion types, the amount of the mixture supplied to the combustion chamber is insufficient, causing a torque step in the form of a drop in torque.

To solve this problem, Patent Document 1 proposes that upon switching from SI combustion to HCCI combustion in a premixed compression ignition type engine with a supercharger, switching to HCCI combustion is performed only after the conditions for performing HCCI combustion are fulfilled by raising the pressure and temperature in the combustion chamber using the supercharger.

Patent Document 1: JP 2004-176688 A

DISCLOSURE OF THE INVENTION

Problem to be Solved by the Invention

However, because a supercharger is an indispensable component of the premixed compression ignition type engine disclosed in Patent Document 1, this proposal does not apply to a premixed compression ignition type engine without a supercharger. Thus, the art of Patent Document 1 has a problem in its inability to offer a solution to an excess or deficiency in the amount of intake mixture caused upon switching between SI combustion and HCCI combustion.

The present invention has been made to solve the above-mentioned problem, and therefore has an object of providing a premixed compression ignition type engine and a method of controlling intake air thereof, such that it is possible to overcome the excess or deficiency in the amount of intake mixture caused upon switching between spark ignition combustion and premixed compression ignition combustion, regardless of the presence or absence of a supercharger.

Means for Solving the Problems

A premixed compression ignition type engine capable of switching between spark ignition combustion and premixed compression ignition combustion is characterized in that the engine comprises:

a first branch intake passage and a second branch intake passage, one end of each passage communicating with a combustion chamber;

a common intake passage communicating with the other ends of the first branch intake passage and the second branch intake passage;

a fuel supply device provided in the common intake passage, for mixing air with fuel to produce a mixture;

a switching means for bringing the common intake passage into communication with at least one of the first branch intake passage and the second branch intake passage;

a flow rate adjusting means provided in the first branch intake passage, for controlling a flow rate of the mixture flowing through the first branch intake passage; and a control device for actuating the switching means upon switching between spark ignition combustion and premixed compression ignition combustion.

A method of controlling intake air of a premixed compression ignition type engine capable of switching between spark ignition combustion and premixed compression ignition combustion, the engine comprising a first branch intake passage and a second branch intake passage each communicating with a combustion chamber, a switching valve for acting so as to cause a mixture to flow through at least one of the first branch intake passage and the second branch intake passage, and a throttle valve provided in the first branch intake passage, is characterized in that the switching valve acts so as to cause the mixture to flow through only the second branch intake passage after switching from spark ignition combustion to premixed compression ignition combustion.

Effect of the Invention

According to the present invention, by comprising: a first branch intake passage and a second branch intake passage one end of passage communicating with a combustion chamber; a common intake passage communicating with the other ends of the first branch intake passage and the second branch intake passage; a fuel supply device provided in the common intake passage, for mixing air with fuel to produce a mixture; a switching means for bringing the common intake passage into communication with at least one of the first branch intake passage and the second branch intake passage; a flow rate adjusting means provided in the first branch intake passage, for controlling a flow rate of the mixture flowing through the first branch intake passage; and a control device for actuating the switching means upon switching between spark ignition combustion and premixed compression ignition combustion, because the mixture flows through only the second branch intake passage upon switching from spark ignition combustion to premixed compression ignition combustion and is supplied to the combustion chamber without adjusting the flow rate thereof, the amount of the mixture sucked into the combustion chamber can be prevented from becoming deficient. Furthermore, by allowing the mixture to flow through only the first branch intake passage where the amount of the mixture can be adjusted in advance to a suitable amount by the flow rate adjusting means upon switching from premixed compression ignition combustion to spark ignition combustion, because the mixture whose flow rate is adjusted is supplied to the combustion chamber, the amount of the mixture sucked into the combustion chamber can be prevented from becoming excessive. Accordingly, an excess or a deficiency in the amount of the intake mixture, which is caused upon switching between spark ignition combustion and premixed compression ignition combustion, can be overcome regardless of the presence or absence of a supercharger.

BEST MODE FOR CARRYING OUT THE INVENTION

The embodiment of the present invention will be described hereinafter with reference to the accompanying drawings.

Figure 1:
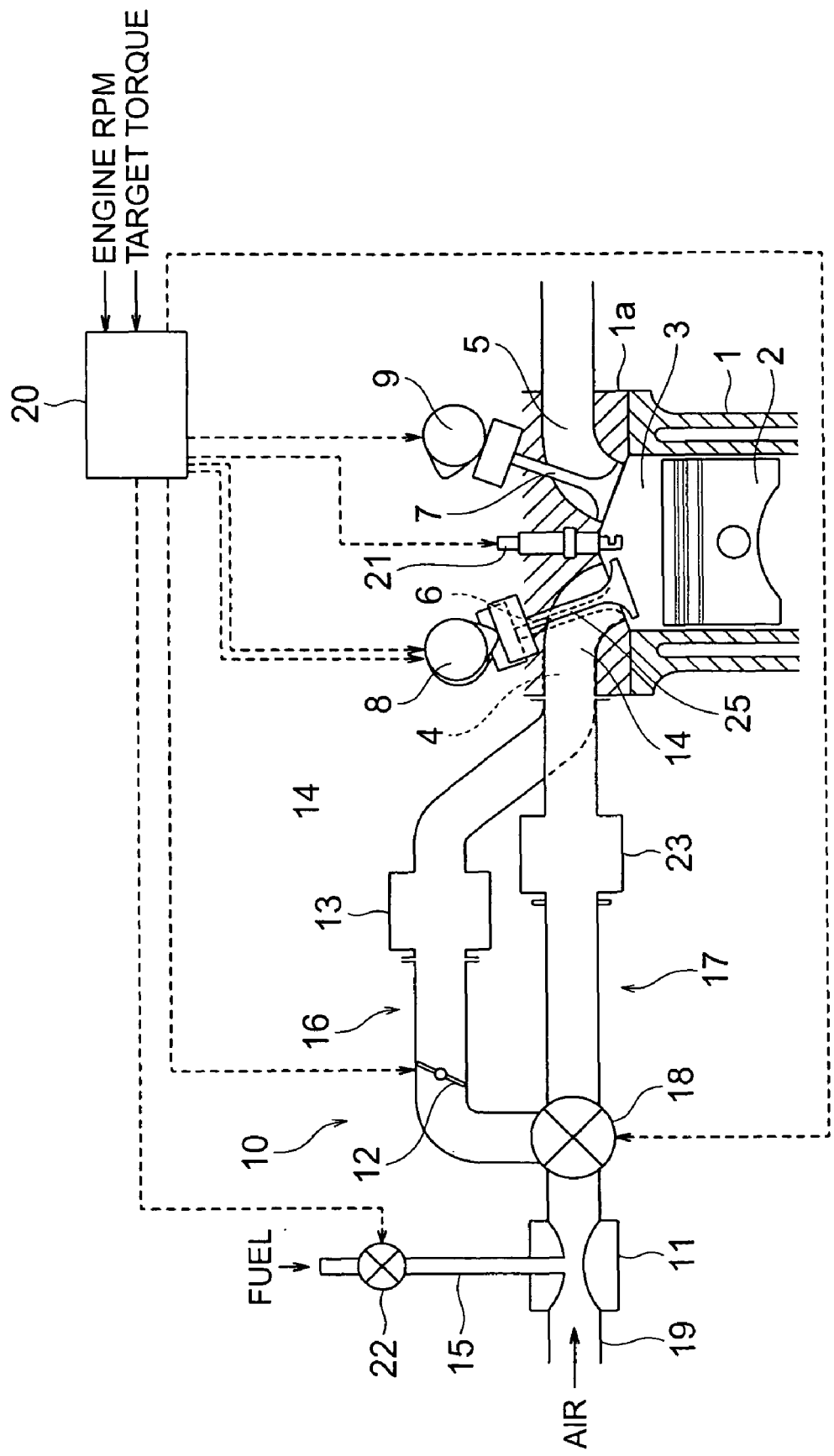
FIG. 1 is a diagram showing the construction of a premixed compression ignition type engine according to an embodiment of the present invention.

A gas engine for a gas heat pump (hereinafter referred to as GHP) will be described as an example of the premixed compression ignition type engine according to this embodiment. As shown in FIG. 1, the gas engine for the GHP according to this embodiment comprises: a cylinder 1; a piston 2 being vertically movable within the cylinder 1; a combustion chamber 3 formed above the piston 2 within the cylinder 1 defined by the cylinder 1, the piston 2 and a cylinder head 1a; two intake ports 4 and 14 and an exhaust port 5 formed within the cylinder head 1a and connected to the combustion chamber 3; intake valves 6 and 25 and an exhaust valve 7 bringing the intake ports 4 and 14 and the exhaust port 5 into or out of communication with the combustion chamber 3 respectively; and an ignition plug 21 disposed so as to penetrate into the combustion chamber 3 from an upper portion of the cylinder head 1a. Cam shafts (not shown) for driving the intake valves 6 and 25 and the exhaust valve 7 are provided with known variable valve control mechanisms 8 and 9, respectively. Each of the variable valve control mechanisms 8 and 9 can control both the actuation period and the lift amount of the intake valve 25 and the exhaust valve 7 which are operated by cams. An intake passage 10 is provided so as to communicate with the combustion chamber 3, and it comprises a first branch intake passage 16 having the intake port 4 at one end thereof, a second branch intake passage 17 having the intake port 14 at one end thereof, and a common intake passage 19 communicating with the other ends of the first branch intake passage 16 and the second branch intake passage 17. The common intake passage 19 is provided with a mixer 11 which is a fuel supply device for producing a mixture by mixing air flowing through the common intake passage 19 and natural gas, which is a fuel, flowing through a fuel passage 15. The fuel passage 15 which communicates with the mixer 11 is provided with a fuel flow rate control valve 22. The fuel flow rate control valve 22 controls the flow rate of city or municipal gas which is a gaseous fuel, and cooperates with a throttle valve 12 to control the air-fuel ratio of the mixture. The intake passage 10 is provided with a switching valve 18, which is a switching means, for bringing the common intake passage 19 into communication with at least one of the first branch intake passage 16 and the second branch intake passage 17. The first branch intake passage 16 is provided with the throttle valve 12, which is a flow rate adjusting means for adjusting the flow rate of the mixture flowing through the first branch intake passage 16, and an intake manifold including a surge tank 13 provided downstream of the throttle valve 12. The second branch intake passage 17 comprises an intake manifold including a surge tank 23. In addition, the gas engine for the GHP according to this embodiment is also provided with an ECU 20 which is a control device. The variable valve control mechanisms 8 and 9, the throttle valve 12, the switching valve 18, and the ignition plug 21 are electrically connected to the ECU 20.

Next, the operation of the premixed compression ignition type engine according to this embodiment will be described.

When the gas engine for the GHP according to this embodiment is started, the air flowing through the common intake passage 19 and the natural gas flowing through the fuel passage 15 are mixed with each other in the mixer 11 to become the mixture, as shown in FIG. 1. When starting the gas engine for the GHP, the switching valve 18 communicates the common intake passage 19 with the first branch intake passage 16. After the flow rate of the mixture is adjusted by the throttle valve 12, the mixture flows through the first branch intake passage 16 and into the intake manifold including the surge tank 13. When the intake valve 6 is opened, the mixture is sucked into the combustion chamber 3 through the intake port 4. That is, the mixture flows through only the first branch intake passage 16 to be sucked into the combustion chamber 3. The mixture sucked into the combustion chamber 3 is compressed by the piston 2, ignited at a suitable time by the ignition plug 21 to combust. Exhaust gas produced after combustion is discharged to the exhaust port 5 when the exhaust valve 7 is opened.

Figure 2:
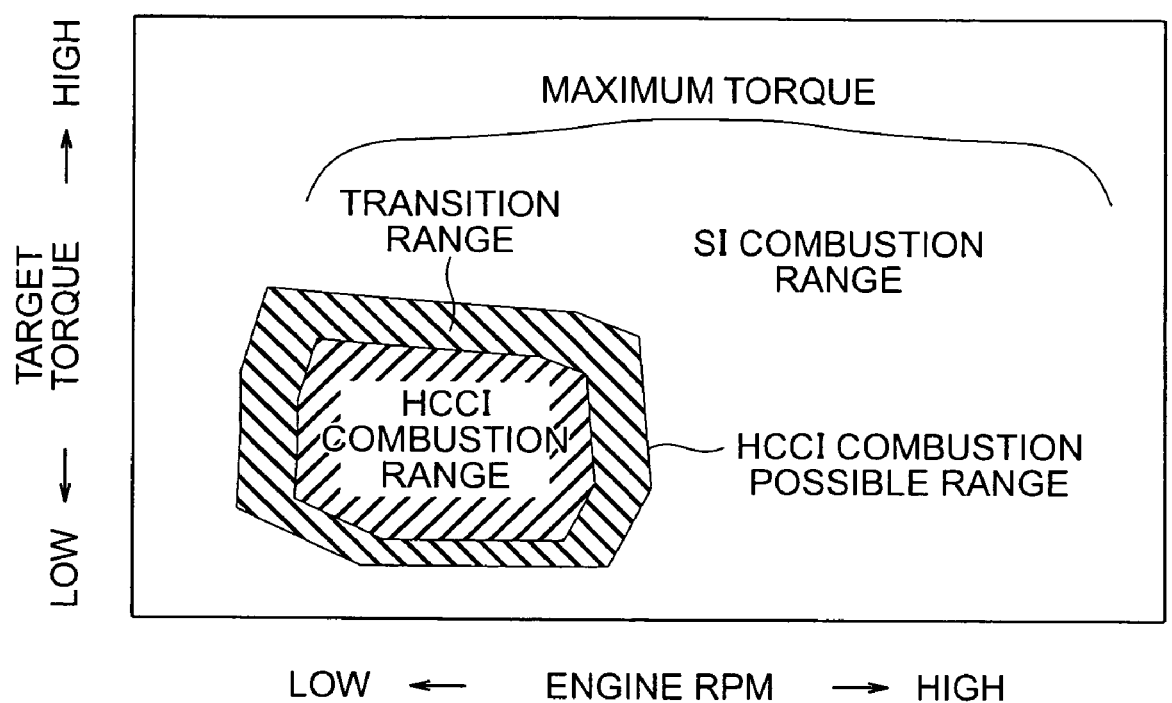
FIG. 2 is a map showing the relationship between a premixed compression ignition combustion range and a spark ignition combustion range.

In general, spark ignition (SI) combustion as described above is performed when starting the gas engine for the GHP. In the premixed compression ignition (HCCI) combustion according to this embodiment, ignition timing control is performed by controlling the temperature of the gas in the combustion chamber 3 while also making use of a later-described internal EGR. Thus, because the temperature of the engine greatly influences the ignition control, until the warm-up process is completed and the temperature of the engine is stabilized, the engine is under an operational condition that makes it substantially difficult to perform HCCI combustion. A map as shown in FIG. 2, which represents the relationship between SI combustion range and a premixed compression ignition (HCCI) combustion range, is incorporated in the ECU 20. When starting the gas engine for the GHP, the engine is not usually under the condition of the HCCI combustion range. In other words, because the state of operation which is expressed by engine rotational speed and engine torque is not suited for HCCI combustion, the ECU 20 determines that the engine is under the conditions for SI combustion, causes the mixture to flow through only the first branch intake passage 16 by actuating the switching valve 18, and actuates the ignition plug 21 at a suitable timing. After that, the ECU 20 receives signals indicating the rotational speed of the gas engine, the target torque, and so on. When the ECU 20 determines that the engine is under the conditions for HCCI combustion, it switches to the operation for HCCI combustion. In the map of this embodiment shown in FIG. 2, for convenience of control, a transition range is provided between the HCCI combustion range and the SI combustion range. The transition range is provided so as to surround the outer limit of the HCCI combustion range within a range in which HCCI combustion can be performed (HCCI combustion possible range). The reason for providing the transition range will be described later. The HCCI combustion possible range in which suitable combustion and suitable control can be performed without causing any inconveniences such as premature ignition or knocking even when HCCI combustion is performed, is provided in the range in which HCCI combustion can be performed. For this reason, the range in which HCCI combustion can be performed differs depending on each set of conditions prerequisite for the gas engine for the GHP, such as the kind of fuel and the characteristics of the variable valve control mechanisms. The map shown in FIG. 2 is no more than an example in this embodiment.

Figure 3:
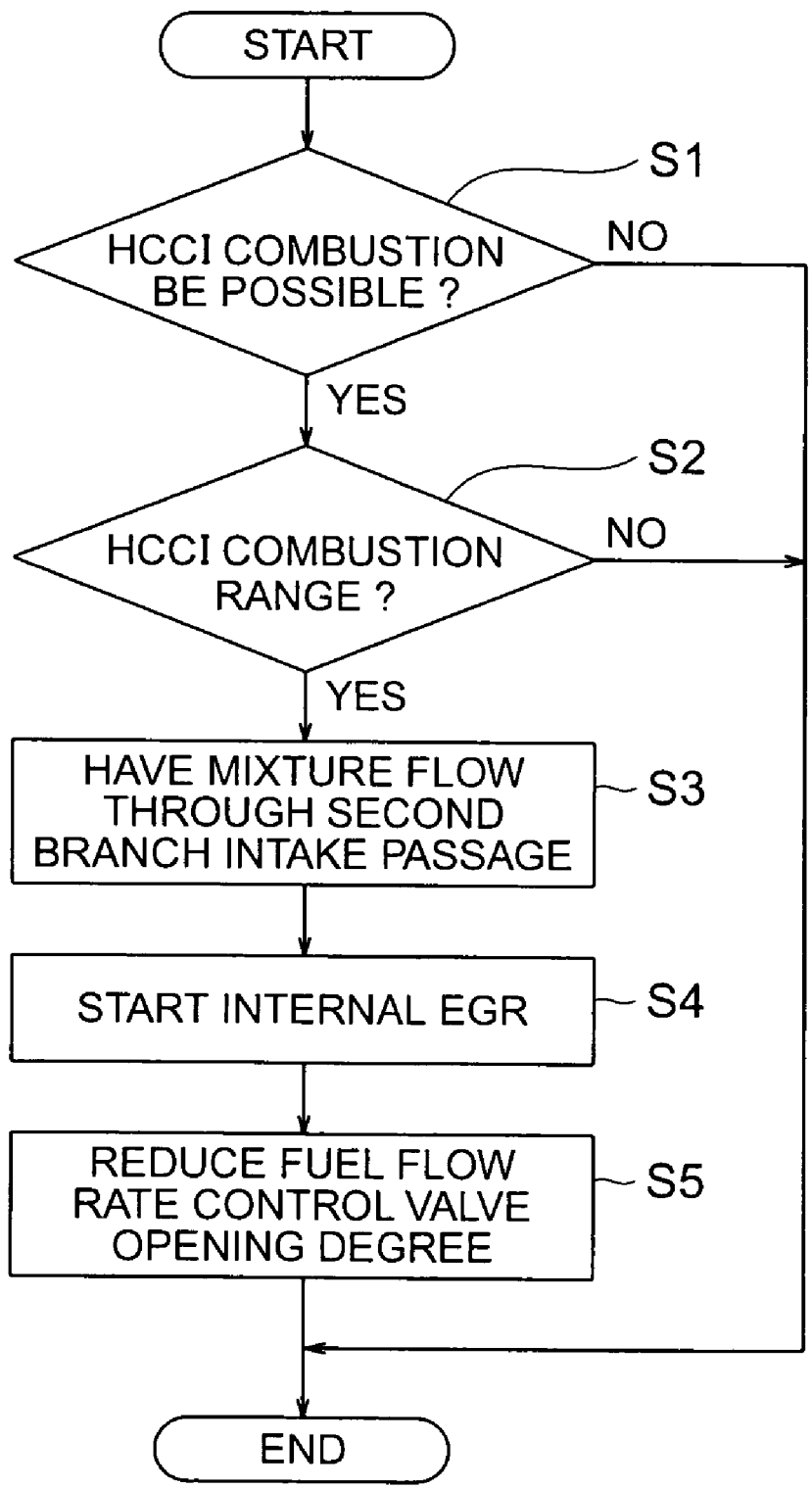
FIG. 3 is a flowchart for explaining the procedure of switching from spark ignition combustion to premixed compression ignition combustion in the premixed compression ignition type engine according to this embodiment.

Next, the procedure for switching from SI combustion to HCCI combustion in the premixed compression ignition type engine according to this embodiment will be described on the basis of the flowchart in FIG. 3.

Figure 4:
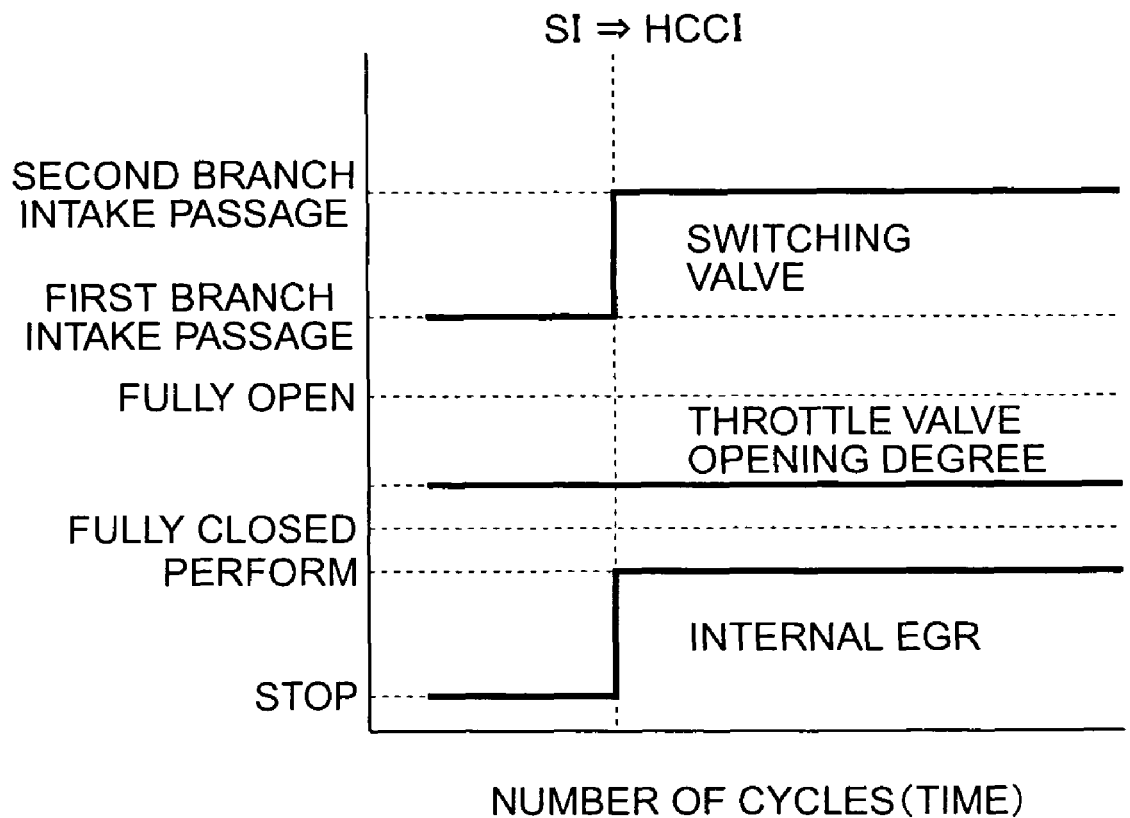
FIG. 4 is a diagram showing the switching operation of a switching valve, the opening/closing operation of a throttle valve, and the state in which an internal EGR is performed or stopped with the passage of time upon switching from spark ignition combustion to premixed compression ignition combustion in the premixed compression ignition type engine according to this embodiment.

In the case where SI combustion is performed in the gas engine for the GHP, it is periodically determined whether HCCI combustion can be performed or not based on the operational range of the gas engine for the GHP and the operational condition thereof. If HCCI combustion can be performed, the operation switches to HCCI combustion. When this process is started, it is first determined whether the gas engine for the GHP has been warmed up to allow HCCI combustion or not (step S1). More specifically, a detection means (not shown) is used to detect the coolant temperature and oil temperature of the gas engine for the GHP. If one of the coolant or oil temperatures is lower than a preset threshold, it is determined that the current state of the engine is not suited for HCCI combustion, and the above-mentioned process is terminated. On the other hand, if both the coolant temperature and the oil temperature of the gas engine for the GHP are higher than the threshold, a determination on the range of operation is performed in order to determine whether HCCI combustion can be performed or not. More specifically, the ECU 20 determines whether the state of operation is within the HCCI combustion range or not (step S2) based on the map shown in FIG. 2. If it is determined that the state of operation is not within the HCCI combustion range, the above-mentioned process is terminated. On the other hand, if it is determined that the state of operation is within the HCCI combustion range, the ECU 20 actuates the switching valve 18 to cause the mixture to flow through only the second branch intake passage 17 by bringing the common intake passage 19 into communication with the second branch intake passage 17 (step S3). At the same time, the ECU 20 controls the variable valve control mechanisms 8 and 9 to stop the opening/closing of the intake valve 6, and switches to the control for opening/closing the intake valve 25 to advance the timing for closing the exhaust valve 7 with respect to top dead center and retard the timing for opening the intake valve 25 with respect to top dead center, thereby performing the control of so-called negative overlap (step S4). That is, a portion of the exhaust gas is retained in the combustion chamber 3 (internal EGR) by closing the exhaust valve 7 in the course of an exhaust stroke. The ECU 20 changes the air-fuel ratio of the mixture to the lean side by reducing the degree of opening of the fuel flow rate control valve 22 (step S5). This control is performed to prevent a torque step from being created after taking into account the fact that HCCI combustion is higher in thermal efficiency than SI combustion. The procedure for switching is terminated as described above. Note that, upon switching from SI combustion to HCCI combustion, because the mixture does not flow through the first branch intake passage 16, the degree of opening of the throttle valve 12 does not have to be adjusted. FIG. 4 shows the operation of actuating the switching valve 18, the operation of opening/closing the throttle valve 12, and the state in which internal EGR is performed or stopped with the passage of time.

Because the mixture sucked into the combustion chamber 3 is mixed with the high-temperature burned gas retaining in the combustion chamber 3 by internal EGR, the temperature of the gas in the combustion chamber 3 rises. Thus, because the temperature in the combustion chamber 3 in the vicinity of compression top dead center also increases, compression self-ignition occurs stably.

Conventionally, the mixture sucked into the combustion chamber 3 may become deficient immediately after switching to HCCI combustion. By realizing negative overlap for internal EGR, the period in which the mixture can be sucked into the combustion chamber in an intake stroke changes, and the variable valve control mechanism substantially serves to control the amount of the mixture entering the combustion chamber as well. Because the amount of the in-cylinder gas needs to be greater during HCCI combustion than during SI combustion, the throttle valve 12 is fully opened to compensate for excessive deficiency in the mixture. However, because the HCCI combustion range is between a low-rotation low-load range and an intermediate-rotation intermediate-load range and the degree of opening of the throttle valve 12 is low before switching combustion, the pressure downstream of the throttle valve 12 is less than or equal to atmospheric pressure (a negative pressure). Furthermore, if the mixture is allowed to flow through the first branch intake passage 16 upon switching from SI combustion to HCCI combustion, the condition where the pressure in the intake port 4 is temporarily less than or equal to atmospheric pressure (a negative pressure) is not overcome and the amount of the mixture sucked into the combustion chamber 3 may become deficient because the operation of opening/closing the throttle valve 12 is slow due to the characteristics of an actuator. However, because the switching valve 18 ensures that the mixture flows through only the second branch intake passage 17, the mixture whose flow rate is not adjusted by the throttle valve 12 flows through the intake port 14. Therefore, the state of the negative pressure in the intake port 14 is swiftly overcome, and the amount of the mixture sucked into the combustion chamber 3 is prevented from becoming deficient. Thus, a reduction in torque is prevented.

After switching from SI combustion to HCCI combustion according to the above-mentioned procedure, if the condition of operation is within the HCCI combustion range, HCCI combustion is continued. If the state of operation fluctuates within the HCCI combustion range, HCCI combustion can be stably continued by controlling the variable valve control mechanisms 8 and 9 to change the amount of internal EGR or adjusting the degree of opening of the fuel flow rate control valve. If the condition of operation shifts outside the HCCI combustion range, the ECU 20 switches to SI combustion for actuating the ignition plug 21 at compression top dead center or at a suitable timing before or after compression top dead center. More specifically, when the state of operation shifts from inside the transition range to the transition range within the HCCI combustion possible range, switching to SI combustion is performed. If the switching is performed after the state of operation shifts outside of the HCCI combustion possible range, the performance of control may be too late to prevent inconveniences such as engine stalling and so on. To avoid such inconveniences, the transition range is provided outside the HCCI combustion range within the HCCI combustion possible range. Thus, the width of the transition range is determined such that the operational state of the gas engine for the GHP shifts from the HCCI combustion range to the SI combustion range without detecting that it is in the transition range.

Figure 5:
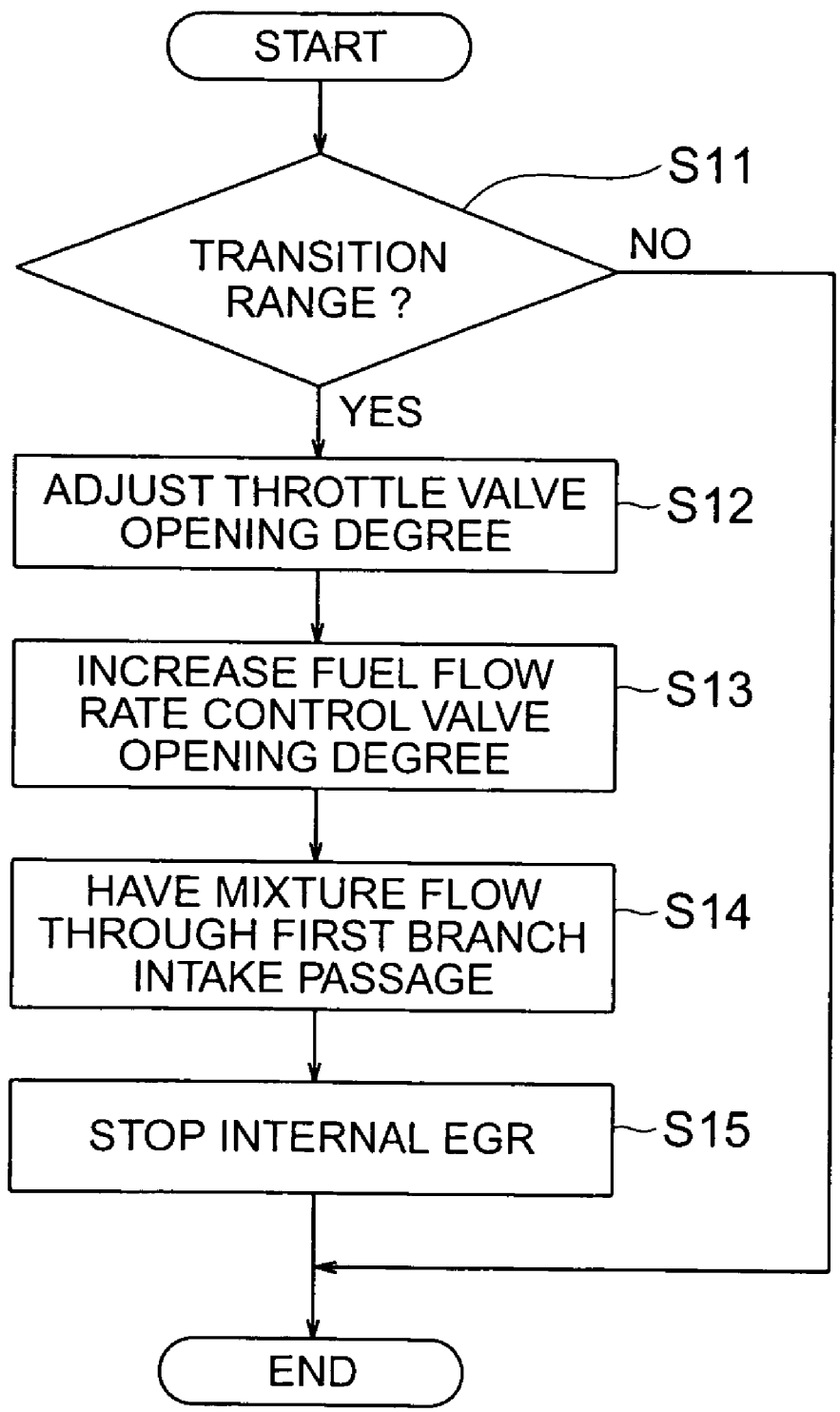
FIG. 5 is a flowchart for explaining the procedure of switching from premixed compression ignition combustion to spark ignition combustion in the premixed compression ignition type engine according to this embodiment.

Next, the procedure for switching from HCCI combustion to SI combustion in the premixed compression ignition type engine according to this embodiment will be described on the basis of the flowchart in FIG. 5.

Figure 6:
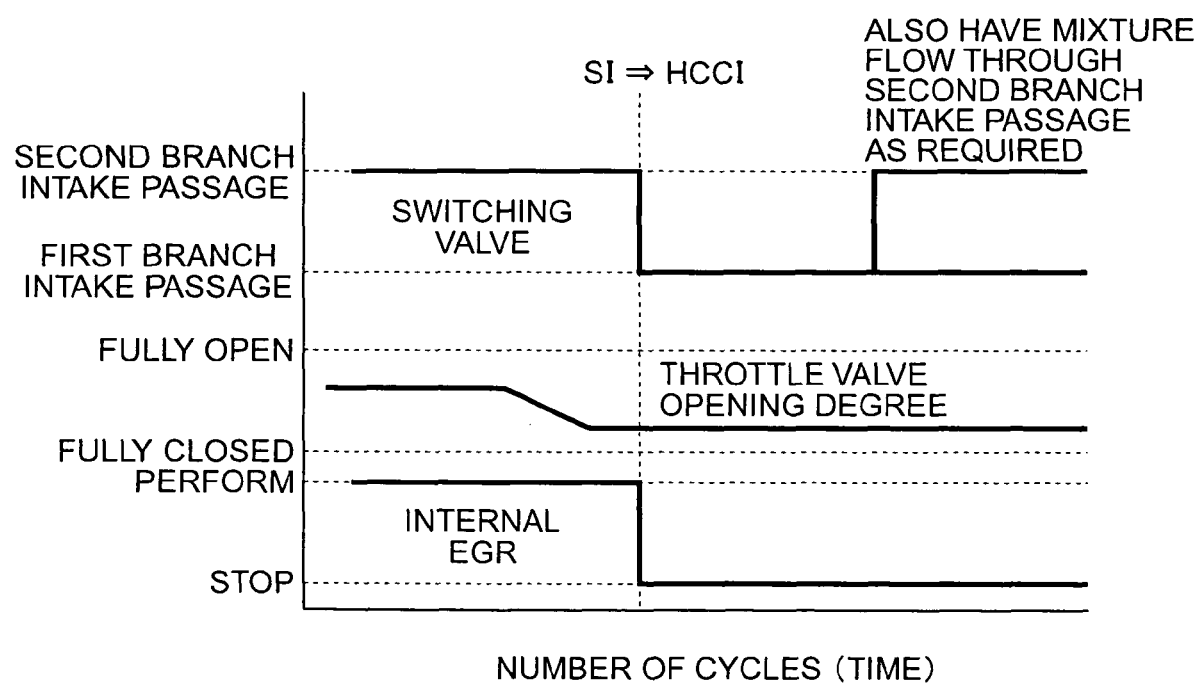
FIG. 6 is a diagram showing the switching operation of a switching valve, the opening/closing operation of a throttle valve, and the state in which an internal EGR is performed or stopped with the passage of time upon switching from premixed compression ignition combustion to spark ignition combustion in the premixed compression ignition type engine according to this embodiment.

In the case where HCCI combustion is performed in the gas engine for the GHP, the ECU 20 periodically determines whether shifting to SI combustion should be performed or not based on the range of operation and the condition of operation. If shifting to SI combustion is likely to occur based on the shifting of the state of operation to the transition range, switching to SI combustion is performed. When this process is started, it is determined whether the condition of operation is within the transition range or not based on the map shown in FIG. 2 (step S11). If it is determined that the condition of operation is not within the transition range, HCCI combustion is continued and the above-mentioned process is terminated. On the other hand, if it is determined that the condition of operation is within the transition range, the ECU 20 adjusts the degree of opening of the throttle valve 12 to an opening degree appropriate to the amount of the mixture at the time of SI combustion. That is, the ECU 20 establishes a state in which the throttle valve 12 adjusts the flow rate of the mixture to a suitable flow rate in advance (step S12). The ECU 20 also acts as a control to increase the degree of opening of the fuel flow rate control valve 22, thereby changing the air-fuel ratio to the rich side so that the air-fuel ratio becomes suited for SI combustion (step S13). After the operation of adjusting the degree of opening of the throttle valve 12 and the changing in the air-fuel ratio are terminated, the ECU 20 actuates the switching valve 18 to bring the common intake passage 19 into communication with the first branch intake passage 16, thereby causing the mixture to flow through only the first branch intake passage 16 (step S14). Simultaneously with the actuation of the switching valve 18, the ECU 20 controls the variable valve control mechanisms 8 and 9 to stop the opening/closing of the intake valve 25 and to switch to controlling the opening/closing of the intake valve 6 so as to cancel the state of negative overlap. In other words, the ECU 20 stops internal EGR (step S15). The procedure for switching is terminated as described in the above. After that, when the output of the gas engine for the GHP rises during SI combustion, the required amount of the mixture increases. In this case, the ECU 20 actuates the switching valve 18 to bring the common intake passage 19 into communication with both the first branch intake passage 16 and the second branch intake passage 17 as required, so as to cause the mixture to flow through both the first branch intake passage 16 and the second branch intake passage 17. FIG. 6 shows the operation of actuating the switching valve 18, the operation of opening/closing the throttle valve 12, and the state in which internal EGR is performed or stopped with the passage of time.

When switching to SI combustion with the mixture flowing through the second branch intake passage 17, because the difference between the pressures in the intake port 14 and the combustion chamber 3 increases due to the stop of internal EGR, the mixture whose amount is more than or equal to the amount which is required in SI combustion is sucked into the combustion chamber 3 temporarily. As a result, a torque step may be caused so as to increase the torque. However, when the switching valve 18 is actuated after the degree of opening of the throttle valve 12 is adjusted to the degree of opening appropriate for the amount of the mixture at the time of SI combustion, the mixture flows through the first branch intake passage 16 by stopping internal EGR after the throttle valve 12 adjusts the flow rate of the mixture to a suitable flow rate in advance. Therefore, the amount of the mixture sucked into the combustion chamber 3 is prevented from temporarily becoming excessive. As a result, abnormal combustion, namely, a rise in torque is prevented.

As described above, because a first branch intake passage 16 and a second branch intake passage 17, one end of each passage communicating with combustion chamber 3, a common intake passage 19 communicating with the other ends of the first branch intake passage 16 and the second branch intake passage 17, a mixer 11 for mixing air with fuel to produce a mixture, a switching valve 18 for acting to bring the common intake passage 19 into communication with at least one of the first branch intake passage 16 and the second branch intake passage 17, a throttle valve 12 for controlling a flow rate of the mixture flowing through the first branch intake passage 16, and an ECU 20 for actuating the switching valve 18 are provided, where the ECU 20 actuates the switching valve 18 to cause the mixture to flow through only the second branch intake passage 17 upon switching from spark ignition combustion to premixed compression ignition combustion, the mixture to be supplied to the combustion chamber 3 without adjusting the flow rate thereof, and thus the amount of the mixture sucked into the combustion chamber 3 can be prevented from becoming deficient. Furthermore, because the ECU 20 actuates the switching valve 18 to cause the mixture to flow through only the first branch intake passage 16 after adjusting the degree of opening of the throttle valve 12 to the degree of opening appropriate for the amount of the mixture at the time of SI combustion upon switching from premixed compression ignition combustion to spark ignition combustion and the mixture whose flow rate is adjusted is supplied to the combustion chamber 3, the amount of the mixture sucked into the combustion chamber 3 can be prevented from becoming excessive. Accordingly, an excess or a deficiency in the amount of the intake mixture which is caused upon switching between spark ignition combustion and premixed compression ignition combustion can be overcome.

This embodiment adopts a structure in which the variable valve control mechanism 8 drives only one of the intake valves 6 and 25 at the time of SI combustion or HCCI combustion. However, this structure is not indispensable. Because the present invention adopts the structure switching between the first branch intake passage 16 and the second branch intake passage 17, the present invention can also be implemented even in a structure in which both the intake valves 6 and 25 are constantly driven. However, stopping one of the intake valves 6 and 25 to which the mixture is not supplied is advantageous in terms of reduction in friction and so on. Furthermore, because the operation of the engine is controlled by changing the amount of internal EGR without using the throttle valve 12 at the time of HCCI combustion, the variable valve control mechanism 8 must have a function of changing the timing for opening/closing the intake valve 25.

In this embodiment, city or municipal gas is used as fuel. However, the present invention is not limited thereto. Any gaseous fuel such as natural gas can be used.

In this embodiment, the premixed compression ignition type engine is described by referring to a gas engine for a GHP as an example. However, the present invention is not limited thereto. The premixed compression ignition type engine may also be a diesel engine using light oil as a fuel or a gasoline engine. The premixed compression ignition type engine is not limited to an engine having a single cylinder. However, it may be any type of engine such as an inline four-cylinder engine or a V-eight engine.

The invention claimed is:

1. A premixed compression ignition type engine capable of switching between spark ignition combustion and premixed compression self-ignition combustion, characterized in that the engine comprises:
  a first branch intake passage and a second branch intake passage, one end of each passage communicating with a combustion chamber;
  a common intake passage communicating with the other ends of the first branch intake passage and the second branch intake passage;
  a fuel supply device provided in the common intake passage, for mixing air with fuel to produce a mixture;
  a switching means for bringing the common intake passage into communication with at least one of the first branch intake passage and the second branch intake passage;
  a flow rate adjusting means provided in the first branch intake passage, for controlling a flow rate of the mixture flowing through the first branch intake passage; and
  a control device for actuating the switching means upon switching between spark ignition combustion and premixed compression self-ignition combustion.

2. The premixed compression ignition type engine according to claim 1, wherein the switching means brings the common intake passage into communication with only the second branch intake passage at a time of premixed compression ignition combustion.

3. The premixed compression ignition type engine according to claim 1, wherein the switching means brings the common intake passage into communication with only the first branch intake passage at a time of spark ignition combustion.

4. A method of controlling intake air of a premixed compression ignition type engine capable of switching between spark ignition combustion and premixed compression self-ignition combustion, the engine comprising a first branch intake passage and a second branch intake passage each communicating with a combustion chamber, a switching valve for acting so as to cause a mixture to flow through at least one of the first branch intake passage and the second branch intake passage, and a throttle valve provided in the first branch intake passage, characterized in that the switching valve acts so as to cause the mixture to flow through only the second branch intake passage after switching from spark ignition combustion to premixed compression self-ignition combustion.

5. The method according to claim 4, characterized in that the degree of opening of the throttle valve is adjusted to the degree of opening appropriate for the amount of the mixture at a time of spark ignition combustion upon switching from premixed compression ignition combustion to spark ignition combustion, and
  the switching valve acts so as to cause the mixture to flow through only the first branch intake passage after the operation of adjusting the degree of opening of the throttle valve is terminated.

* * * * *